Dec. 14, 1954
W. M. JEFFERS
2,697,217
GROUND DETECTING APPARATUS
Filed March 17, 1953
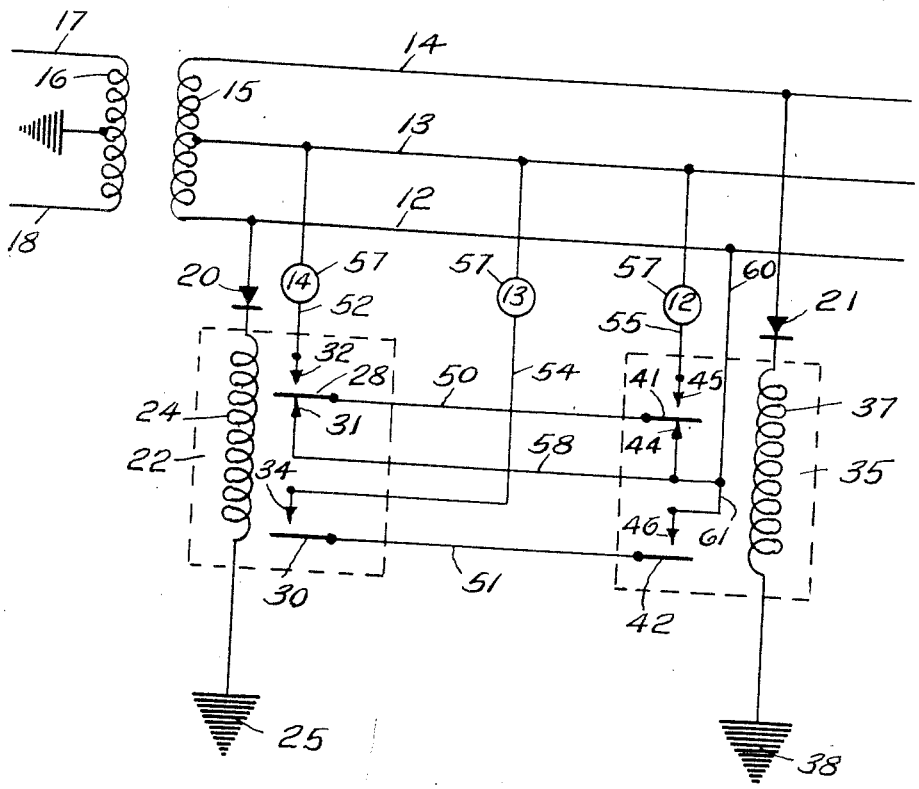
INVENTOR.
WALTER M. JEFFERS.
BY
D. Emmett Thompson
ATTORNEY.

United States Patent Office

2,697,217
Patented Dec. 14, 1954

2,697,217

GROUND DETECTING APPARATUS

Walter M. Jeffers, Syracuse, N. Y., assignor to Crouse-Hinds Company, Syracuse, N. Y., a corporation of New York Application March 17, 1953, Serial No. 342,900

1 Claim. (Cl. 340—255)

This invention relates to apparatus for detecting the presence of a ground on three-wire alternating current electrical systems, all of the conductors of which are isolated from ground. The apparatus has particular utility in detecting and indicating the presence of a ground in connection with any one of the three wires in a system supplying power to a hazardous location. For example, in a hospital operating room there exists the serious hazard of ignition of explosive anesthetic gases or vapors by electrical sparks. To minimize this hazard, substantially every object in an operating room is electrically grounded, including the patient, furniture and apparatus, and including the personnel in attendance, through conductive shoes and flooring.

Since the patient and attending personnel are grounded, the power supply system must be isolated from ground by means of an isolating transformer to prevent the danger of electrical shock in case contact is accidently made with any of the conductors of the system. Under these circumstances, it becomes highly desirable for the personnel to be warned immediately if there is any connection between any portion of the power supply system and ground.

Accordingly, it is a primary object of this invention to provide an apparatus, embodying a minimum of equipment and functioning with a small current flow, which will give a visible or audible signal upon the occurrence of a ground on any of the wires of the isolated power system.

A more specific object of the invention is to provide an apparatus which will indicate which wire of a three-wire system is connected to ground.

Other objects and advantages of the invention will become apparent from a reading of the following detailed description together with the accompanying drawing, and from the appended claims.

The drawing is a schematic wiring diagram illustrating an electrical circuit and arrangement of apparatus therein for detecting and indicating the existence of a ground on any of the three wires of an alternating current electrical system.

In the drawing, which illustrates a typical embodiment of the invention for the purposes of detailed disclosure, 12, 13 and 14 designate the wires of the three-wire power supply system extending from the secondary winding 15 of an isolating transformer having a primary winding 16 connected to supply line 17, 18. In this system, wire 13 serves as the neutral, and in ordinary practice the potential between wire 13 and either of the wires 12, 14 is 115 volts, while the potential across wires 12, 14 is 230 volts.

A pair of unidirectionally-conductive devices, such as rectifiers 20, 21, are connected to outside wires 12, 14, respectively. These devices permit current flow therethrough in the direction of the arrowheads only. The rectifier 20 is connected to the energizing circuit of a relay 22 having a coil 24 grounded at 25. Relay 22 is adapted to actuate a transfer contact 28 and a make contact 30. The transfer contact 28 normally engages a fixed back contact 31 when the relay is deenergized and this transfer contact 28 moves into engagement with a fixed front contact 32. When the relay becomes energized, the make contact 30 moves into engagement with a fixed front contact 34.

The rectifier 21 is connected to a relay 35 having a coil 37 grounded at 38. The relay 35 is similar to the relay 22 in that it is adapted to actuate a transfer contact 41 and a make contact 42, which contacts are respectively cooperable with fixed contacts 44, 45, 46.

As may be seen from the drawing, the contacts 28, 41, are connected together by a wire 50 and the contacts 30, 42, are connected together by a wire 51. The front contacts 32, 34 and 45 of the relays are connected to the neutral or center wire 13, as by leads 52, 54, 55, respectively, and a signal indicator designated 57, such as a light or buzzer, is connected in each of the leads. The fixed back contacts 31, 44, are connected together by wire 58 and in series to the wire 12 by wire 60, and the front contact 46 engaged by the make contact 42 is connected to wire 60 by wire 61.

Since the rectifiers 20, 21 are connected across wires 12, 14, in opposed relation to each other as shown, no current of practical magnitude flows through the rectifiers or relay coils 24, 37, because one of the rectifiers blocks the current during each half of the alternating cycle. In addition, when wires 12, 13 and 14 are isolated from ground, there is no substantial return path from either of the grounded relay coils to any of the wires. The current in the rectifiers and relay coils is, therefore, normally very close to zero. Under these conditions, the coils are not energized and the signal indicators 57 are all on open circuits. If, however, one of the wires, as for example wire 12, becomes in some way connected to ground, current will flow during the positive half cycle from wire 14 through rectifier 21, coil 37 to ground, and thence through the faulty connection back to wire 12. In other words, relay 35 will be supplied with a pulsating direct current having a peak potential equal to the peak potential between wires 14, 12. This current flow energizes the relay causing contact 41 to move out of engagement with back contact 44 and into engagement with front contact 45 and causing contact 42 to move into engagement with front contact 46. Relay 22 will remain deenergized since the circuit is grounded at both ends. The closing of contacts 41, 45, completes a circuit from wire 13 through lead 55, signal indicator 57 (numbered 12), contacts 41, 45, wire 50, contacts 28, 31, wire 58, wire 60 to wire 12. Thus the signal 57 (numbered 12) receives a potential equal to the potential between the wires 12, 13. Since the relay 22 is not energized, the circuits of the other two signal indicators 57 remain open and only the indicator 57 (numbered 12) is actuated, indicating that wire 12 has a ground fault. The indicators 57 may, of course, be color coded, tagged or otherwise suitably designated to indicate which wire has the ground fault when one of the indicators is actuated.

If wire 14 is the grounded wire, the operation of the apparatus is similar to the operation just described except that relay 22 is energized while relay 35 remains deenergized. In such case, only the signal indicator 57 (numbered 14) is actuated to show that wire 14 has the ground fault, a circuit being completed from wire 13 through the indicator, contacts 28, 32, lead 50, contacts 41, 44 and leads 58, 60, back to wire 12.

In the event that center wire 13 is the wire connected to ground, both relays are energized in the manner described hereinabove. Since contacts 31, 28 and 41, 44 are open, signal indicators 57 (numbered 12 and 14) are in open circuits and are not actuated; however, the indicator 57 (numbered 13) is actuated to indicate that wire 13 has the ground fault. In this case, the circuit is completed from wire 12 through leads 60, 61, contacts 42, 46, lead 51, contacts 30, 34, lead 54 and the indicator to wire 13.

What I claim is:

Ground detecting apparatus for a three-wire alternating current system wherein the conductors are isolated from ground, a pair of unidirectionally-conductive devices respectively connected to opposite outside wires of said system, a pair of relay elements each having an energizing circuit respectively connected to said devices, the opposite sides of said relays being connected to ground, each relay having a make contact normally positioned out of engagement with a front contact, said make contacts being connected together, one of said front contacts being connected in circuit with the center wire of the system and including an indicator, the front contact of said other relay being connected in circuit with one outside wire of the system, each relay also having a transfer contact normally positioned in engagement with a fixed back contact and being movable into engagement with a fixed front contact, said transfer contacts being connected together, said back contacts engaged by said transfer contacts being connected together and to said one outside wire of the system, and each of said front contacts engageable by said transfer contacts being connected to the center wire of the system and including an indicator.

References Cited in the file of this patent

UNITED STATES PATENTS

| Number | Name | Date |
|---|---|---|
| 2,390,778 | Cook | Dec. 11, 1945 |
| 2,428,563 | Fountain | Oct. 7, 1947 |

FOREIGN PATENTS

| Number | Country | Date |
|---|---|---|
| 289,538 | Great Britain | Apr. 30, 1928 |